March 3, 1964 R. C. BRADLEY 3,123,307
APPARATUS FOR SPRAY DEPOSITING REINFORCED SYNTHETIC RESINS
Filed Aug. 29, 1961 2 Sheets-Sheet 1

INVENTOR
RICHARD C. BRADLEY
BY
ATTORNEYS

INVENTOR
RICHARD C. BRADLEY
BY
ATTORNEYS

United States Patent Office 3,123,307
Patented Mar. 3, 1964

3,123,307
APPARATUS FOR SPRAY DEPOSITING
REINFORCED SYNTHETIC RESINS
Richard C. Bradley, 3501 NW. 9th Ave.,
Fort Lauderdale 9, Fla.
Filed Aug. 29, 1961, Ser. No. 134,650
6 Claims. (Cl. 239—336)

This invention relates to improvements in apparatus for spray depositing fiber reinforced synthetic resins.

In the art of fabricating, molding and coating articles with a synthetic resin having fiber reinforcements, it has long been a problem to provide apparatus whereby a single person could apply such reinforced synthetic resin in a facile manner. In such applications, a catalyzed and promoted resin are united and intermixed in an atomized spray, cut roving is introduced to within the spray stream, and the combined resins and cut roving spray deposited for the fabricating, molding, or coating of articles.

Several devices seeking to solve the problems inherent in such spray depositing have previously been provided, such as those shown in the patents of D. F. Anderson, Patent No. 2,933,125, dated April 19, 1960, and Patent No. 2,787,314, dated April 2, 1957. Such devices have, however, to a great extent proven unwieldy, unadaptable to the many uses to which such apparatus may be put, and have not been efficient.

It is therefore a primary object of this invention to provide apparatus for the spray depositing of fiber reinforced synthetic resins that can be easily handled by one person, and has such simplicity of operation that it may be utilized by even the unskilled in fabricating, molding and coating.

A further object is the provision of apparatus for spray depositing fiber reinforced synthetic resins wherein the cutter for supplying the cut roving and the gun for the spray depositing of the synthetic resins are interconnected and commonly activated in order to feed cut fibers into the liquid resin spray at a rate proportional to the rate of flow of the spray, and wherein a single actuating lever accomplishes the feeding of the cut roving and the spraying of the resins.

A further object is the provision of an improved roving cutter for apparatus of this nature which feeds cut fibers of a predetermined length into the liquid resin spray in such a manner so that the fibers may become substantially "pre-wet," by contact with the resin spray prior to contacting the mold. Bridging of the fibers, the major cause of "air bubble entrapment" in a roving reinforced laminate, is also eliminated due to the short length of the roving fibers of my improved apparatus. Due to the fact that the "short fibers" of my improved apparatus are not woven together or mechanically attached to one another, while the composite mixture of roving and resins is in a liquid homogenous state, the fibers are free to move or slide independently of each other into recesses, or over protrusions of a mold or part without being limited in their movement by adjacent fibers.

A further object is the provision of an improved roving cutter having improved feeding and cutting means whereby roving strands are accurately fed into the cutter in direct proportion to the speed of the cutting of the fibers, thereby avoiding any entangling or "stacking up" of the roving strands, and whereby the roving is cut more cleanly and accurately than in previously provided cutters, eliminating the "drag" normally present in those previously provided.

A further object is the provision of an improved mounting relationship between the roving cutter and the spray gun whereby the angle of feed of the cut fibers into the spray stream may be varied, thereby providing an adjustment that makes it possible to direct the flow of cut fibers so that they will be deposited in the center of the fluid streams. This insures "pre-wetting" of the fibers in mid-air, prior to the admixture making contact with the surface to which it is to be applied. Were it not for this adjustment the "dry" fibers would ride on top of the resin streams or fall through the streams, onto the floor. Unless the dry fibers are thoroughly and accurately "pre-wet" in mid-air prior to contact with the surface to which they are to be applied (especially if the surface is vertical or overhead), the dry fibers will fall off of the surface. "Pre-wet" fibers on the other hand will "hang" onto a vertical or overhead surface due to their being coated with the sticky, honey-like, thixotropic, polyester resin. Also, due to the fact that the gun deposits exactly the right amount of resin on each fiber, there is no problem as to transfer of liquid resin from an overly wet, resin rich surface area to another that may be "resin starved."

A further object is the provision of an improved blade mounting structure for roving cutters whereby the blades may be quickly and conveniently changed, eliminating the need for Allen wrenches, set screws, brass shim stock and the like.

Other objects and advantages of the invention will be apparent during the course of the following detailed description, taken in connection with the accompanying drawings, forming a portion of this specification, and in which drawings:

FIG. 5 is an enlarged sectional view taken substantially on the line 5—5 of FIG. 2.

Figure 1:
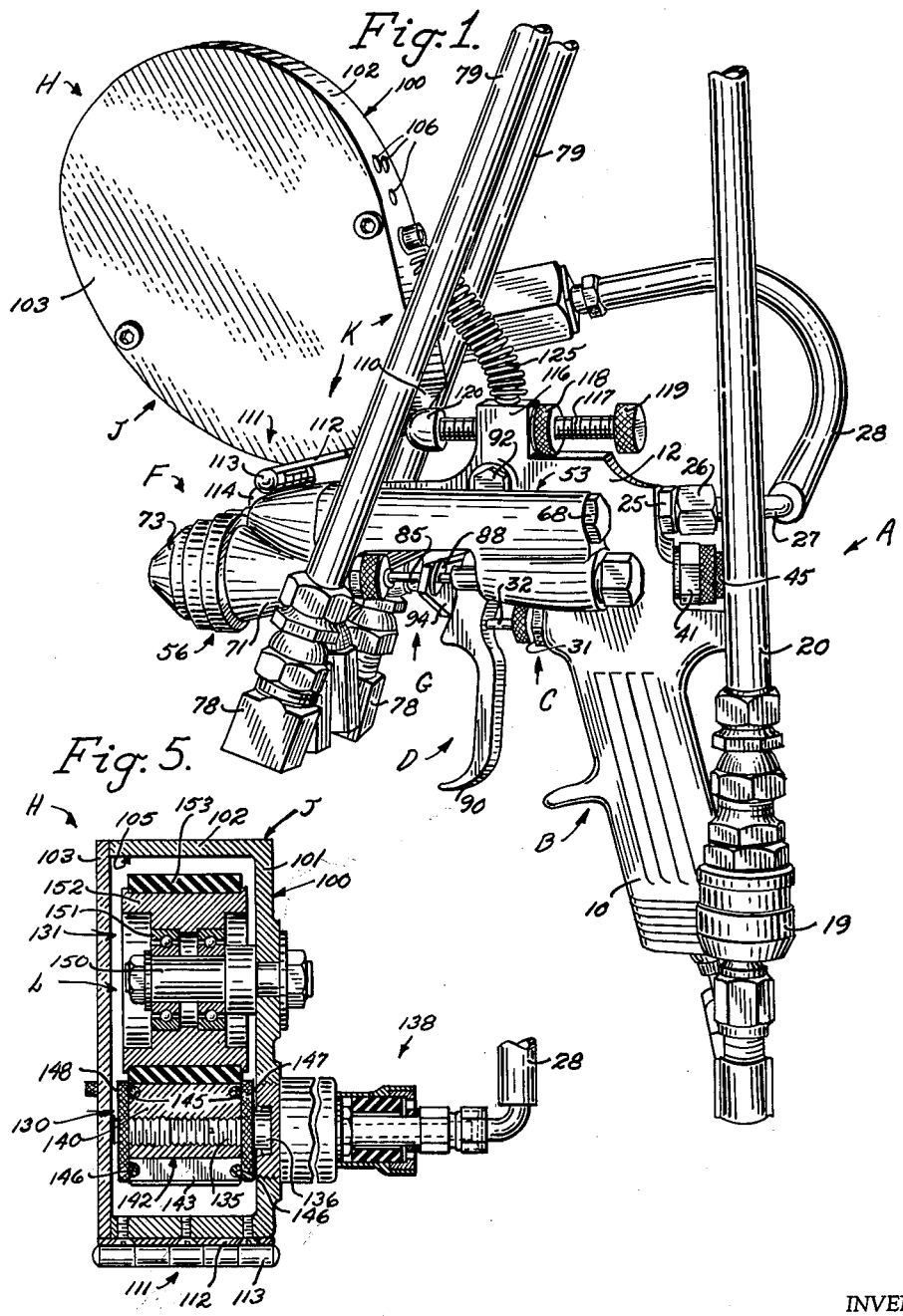
FIG. 1 is a perspective view of my improved apparatus.

In the drawings, wherein for the purpose of illustration is shown a preferred embodiment of the invention, and wherein similar reference characters designate corresponding parts throughout the several views, the letter A may generally designate the spray gun, which may include a main body portion B, valve means C, trigger means D, stop means E, spray means F, and valve means G; and H the cutter means, which may include a housing J, attaching means K, and feeding and cutting means L.

The main body portion B preferably includes a handle portion 10 and a barrel portion 12 extendant therefrom. The handle portion 10 is provided with passageways 14 and 15 extending longitudinally therethrough. Each of the passageways 14 and 15 opens at one end thereof into the chamber 16, within which is received valve means C, as will be subsequently described. Passageway 15 is provided at the opposite end thereof from chamber 16 with a plug 17, and passageway 14 is provided at the opposite end thereof from chamber 16 with a hose connection 18. Suitable connecting means 19 may be secured to the connection 18 for the attachment of a hose 20 thereto.

A chamber 21 is provided in the handle portion 10, to the opposite side of chamber 16 from the passageways 14 and 15, which chamber 21 opens into the chamber 16 and receives therewithin the stop means E, as will be subsequently described.

The barrel portion 12 is provided with an elongated passageway 22 therethrough, extendant form the handle 10, which passageway 22 has an opening 23 leading to the chamber 21. The end of the passageway 22 adjacent the handle 10 is provided with a threaded sleeve 25 to which is secured a coupling 26 which supports a conduit 27 leading to hose 28. The hose 28 is interconnected to the cutter means H, as will be subsequently described.

The opposite end of the passageway 22 from the threaded sleeve 25 is provided with a threaded conduit 29 which is secured to the spray means F, as will be subsequently described.

Valve means C preferably includes a housing 31 secured within chamber 16, which housing slidably receives and supports a shaft 32. One end of the shaft 32 extends exteriorly of the housing 31, in juxtaposition for abutment against the trigger means D, as will be subsequently described. The opposite end of the shaft 32 is provided with a plunger 35. A spring 37 is mounted within the chamber 16 and abuts against the plunger 35, urging the shaft 32 into abutment with the trigger means D.

The housing 31 is provided with a first opening 38 which is positioned for opening and closure thereof by the plunger 35, which opening 38 leads to a chamber 39 having a plurality of outlets 40, which outlets 40 lead to the chamber 21.

Stop means E preferably includes a housing 41 which is threaded into and received within the chamber 21, which housing 41 is provided with a portion 42 of reduced diameter, which portion 42 permits air flow from the outlets 40, about the reduced portion 42, through the opening 23 and into the passageway 22. The housing 41 is provided with a threaded portion 44 which receives therewithin a stop screw 45 which has, mounted at one end thereof, and extending outwardly from the housing 41, a shaft 50 which is positioned for abutment against the trigger means D, as will be subsequently described.

Spray means F preferably includes a main housing 53 and nozzle portions 55 and 56.

The main housing 53 is provided with a first passageway 54 which extends in substantial axial alignment with the passageway 22 of the gun A, and which passageway 54 is interconnected to and receives therewithin the threaded conduit 29. Bolt 57 secures the housing 53 to the barrel 12. A mounting plug 60 is secured within the passageway 54, to the opposite end thereof from the threaded conduit 29, which mounting plug 60 serves to provide a closure for one end of the passageway 54, and provides for the mounting of the cutter means H upon the gun A, as will be subsequently described.

The main housing 53 is provided with a pair of passageways 62 and 63 which lead angularly divergently from the passageway 54, to each side thereof. These passageways 62 and 63 lead into passageways 65 and 66, respectively, which passageways 65 and 66 are angularly divergent toward each other at one end thereof, opposite the handle 10 of the gun A.

The passageway 65 provides a conduit leading to nozzle 55 and the passageway 66 provides a conduit leading to nozzle 56. The opposite end of each of the passageways 65 and 66, from their respective nozzles 55 and 56, are provided with plugs 68. Threaded conduits 70 are secured within each of the passageways 65 and 66, at the divergent end thereof, for interconnection thereto of the respective nozzles 55 and 56.

The nozzles 55 and 56 are identical, each including a housing 71, fluid nozzle portion 72 and air nozzle portion 73.

The housing 71 includes a passageway 74 interconnected with a passageway 65 or 66 by sleeve 70, a chamfered valve seat 75, which cooperates with the fluid nozzle portion 72, as will be subsequently described, and a conduit 76 having a passageway 77 therethrough, which passageway 77 opens at an end thereof into the valve seat 75. A suitable connector 78 may be secured to conduit 76 for attachment thereto of hose 79.

Figure 2:
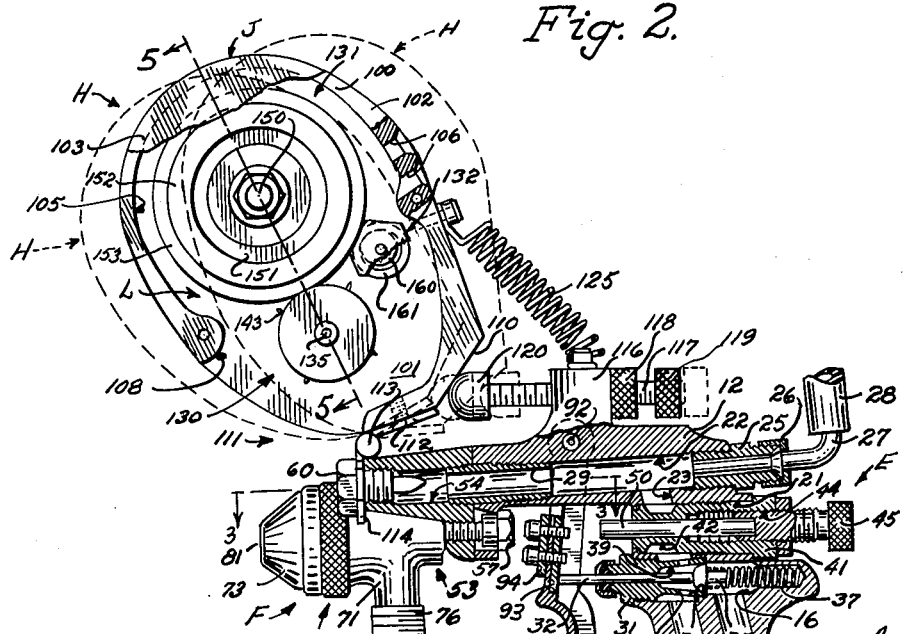
FIG. 2 is a side view of my improved apparatus, with parts thereof broken away to disclose preferred details.
Figure 3:
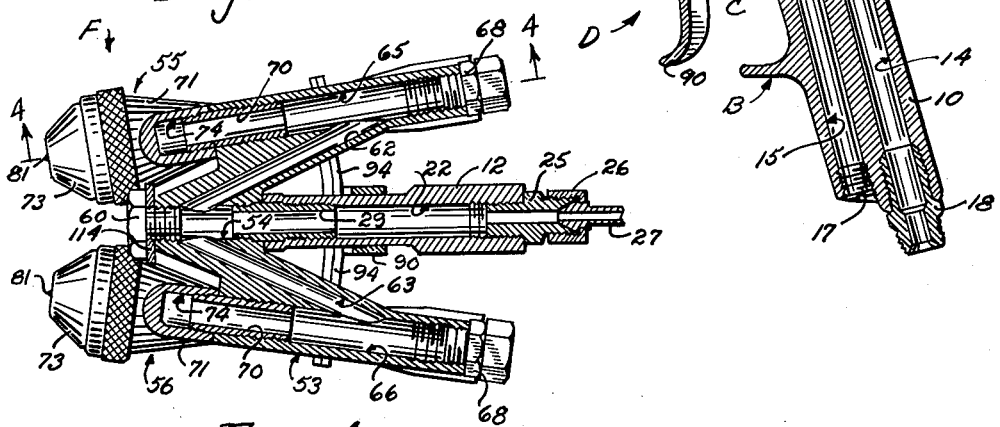
FIG. 3 is an enlarged sectional view taken substantially on the line 3—3 of FIG. 2.
Figure 4:
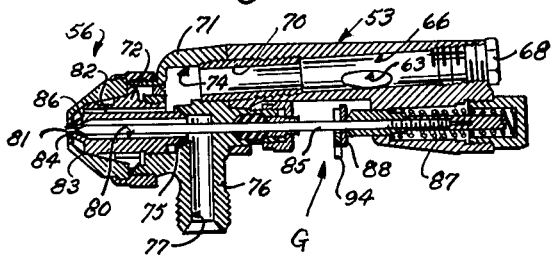
FIG. 4 is an enlarged sectional view taken substantially on the line 4—4 of FIG. 3.

The fluid nozzle portion 72 is seated within valve seat 75 and has a passageway 80 which opens at one end thereof into passageway 77 and is tapered at the other end thereof to provide a restricted outlet portion 81. When the spray gun is held in a horizontal position, as shown in FIG. 2, the outlet portion 81 of each nozzle 55 and 56 will be in the same horizontal plane. Since the nozzles 55 and 56 are mounted in a fixed position upon the spray gun, it is obvious that the axis of the spray issuing from one nozzle will always be in the same plane as the axis of the spray issuing from the other nozzle.

The fluid nozzle portion 72 is provided with a plurality of passageways 82 peripherally about and spaced from the passageway 80. The passageways 82 interconnect and open at one end thereof into passageways 80. The opposite end of the passageways 82 open adjacent the air nozzle portion 73.

Air nozzle portion 73 is secured to housing 71 and includes a tapered wall portion 83 which is convergent toward the restricted outlet portion 81 and is provided, adjacent the restricted outlet portion 81 with an opening 84.

A valve means G is provided for each of the nozzles 55 and 56, which valve means G controls the expulsion of fluid through the passageway 80 and the restricted outlet portion 81. Valve means G preferably includes a shaft 85 slidably received within and supported by the housing 71, the shaft 85 extending through passageway 80 and terminating with a needle-like pointed portion 86 which slidably interfits within the restricted outlet portion 81.

The opposite end of the shaft 85 from the needle-like portion 86 is slidably mounted within the main housing 53 and is spring urged, as by spring 87, toward and into the restricted outlet portion 81. A guide washer 88 is secured to the shaft 85, which guide washer 88 is provided for abutment against the trigger means D, as will be subsequently described.

Trigger means D preferably includes an elongated trigger 90 which is pivotally secured to the main body portion B such as by the pivot stud 92. The trigger 90 has secured thereto a plate 93 in juxtaposition for abutment against the shaft 32 of the valve means C, and likewise has secured thereto an elongated plate 94 which extends outwardly from the trigger 90 into abutment with washer 88 mounted upon the shaft 85 of each valve means G. The plate 93 is in such a position as to abut against the shaft 50 of the stop means E when the desired degree of depression of the trigger has been reached.

The housing J of cutter means H preferably includes a body portion 100 having a main wall 101 and side wall 102 extending normally therefrom. A cover plate 103 may be provided for the body portion 100, the wall 101, side wall 102 and cover plate 103 defining a chamber 105 within which is received the feeding and cutting means L. The side wall 102 is provide with a plurality of opening 106 for the feeding of strands of roving to within the chamber 105. The wall 102 is also provided with a discharge opening 108 through which cut roving may be ejected. One portion of the side wall 102 forms a cam surface 110, for a purpose that will be subsequently described.

Attaching means K preferably includes a hinge means 111 for pivotally securing the housing J to the gun A. The hinge means 111 includes a hinge plate 112 secured to the wall 102 of the housing J, a hinge joint 113, and a hinge plate 114 which is secured to the gun A by the mounting plug 60.

The barrel portion 12 of the gun A is preferably provided with an upstanding lug 116 through which is threaded a shaft 117. One end of the shaft 117 is provided with a lock nut 118 and an adjusting screw head 119, and the other end of the shaft 117 is provided with a cam 120. The cam 120 is mounted in juxtaposition for abutment against the cam surface 110 of the housing J.

A spring 125 is interconnected at one end thereof to the housing J, and at the other end thereof to the lug 116, the spring 125 urging the cam surface 110 of the housing J into abutment with the cam 120.

It will thus be seen that the attaching means K provides for movable mounting of the housing J upon the gun A so that the opening 108 through which the cut roving is ejected may be angularly varied with respect to the jet streams of the nozzles 55 and 56. This provides for centering the cut roving in the jet streams so that the roving will be "pre-wet" and will not ride on top of or fall through the stream.

Feeding and cutting means L preferably includes a cutter roller 130 and a pair of idler rollers 131 and 132. The cutter roller 130 preferably includes a shaft 135 supported upon the wall 101 as by thrust bearing 136, one end of which shaft 135 is interconnected to and driven by the motor 138. Cutter roller 130 includes a main cylindrical body portion 140 which is provided about the periphery thereof with a plurality of slots 142 within which are received individual blades 143. The ends of body portion 140 and each of the blades 143 are provided with grooves 145 within which are received retaining rings 146. The retaining rings 146 secure the blades 143 within the slots 142 of the body portion 140. Washers 147 and 148 are secured upon the shaft 135, one to each side of the body portion 140, which washers 147 and 148 hold the retaining rings 146 within the grooves 145. It will thus be seen that when it is desired to replace any of the cutter blades 143, that it is only necessary to remove the washer 148, snap out the retaining ring 146, at that side of the body portion 140, and slide the blade 143 out of its groove 142. The new blade is then inserted within the vacated groove 142, the retaining ring 146 moved into place within the groove 145, and the washer 148 secured to the shaft 135.

The motor 138 is preferably driven by air, the hose 28 being interconnected thereto for supplying air to the motor 138. This provides a positive linkage between the rate of cutting and the rate of resin deposit through the nozzles 55 and 56, inasmuch as the trigger 90 will govern the supply of air to the motor 138, the supply of air to the air nozzles 73, and the supply of fluid to the nozzles 55 and 56. The cut roving will therefore be dispensed in the resin spray streams from the nozzles 55 and 56 at a rate directly proportional to the rate of flow of the fluid dispensed from the nozzles 55 and 56.

Idler roller 131 preferably includes a shaft 150 secured to the wall 101, about which shaft 150 are mounted bearings 151, which support the roller body portion 152. Mounted peripherally about the roller body portion 152 is a resilient sleeve 153. The sleeve 153 is mounted for direct abutment against the housing 140 of the cutter roller 130, the blades 143 being resiliently received by the sleeve 153 each time one of them abuts thereagainst. The contact of sleeve 153 with the cutter roller 130 causes rotation of the roller 131 and, inasmuch as the cutter blades 143 impress themselves within the sleeve 153, there is provided a positive drive relationship between the rollers 130 and 131.

The roller 132 preferably includes a shaft portion 160 secured to the wall 101, and about which shaft 160 is rotatably mounted a sleeve 161. It is to be noted that the shaft 160 is mounted off-center with respect to the sleeve 161, providing a cam type shaft which may be rotated in order to adjust the pressure of abutment between the sleeve 161 and sleeve 153 so that roving will be pulled positively, without slip into cutting position. The roller 132 thus provides a positive, unbroken and uninterrupted feed of roving strands to the cutter roller 130 regardless of frictional resistance to the strands prior to their entering the housing J. The cam type shaft adjustment is necessary in order to provide a roving cutter that will handle roving of different filaments, 30 end, 60, 120 end, etc.

In dispensing the roving, the same is fed through the openings 106, intermediate the sleeve 153 and the sleeve 161, and intermediate the sleeve 153 and roller body portion 140. When it is thus fed, the impetus of the roving is always toward the cutter roller 130, and each time that one of the blades 143 abuts against the sleeve 153, the strands roving will be severed. I preferably provide three openings 106, so that three separate strands of roving may be fed into the cutter. As the roving is cut by blades 143, the cut fibers will be ejected through the opening 108 and into the resin streams issuing from the nozzles 55 and 56. The rollers are driven by motor 138 at approximately 2700 r.p.m., which rotational force causes the cut roving to be forcefully ejected from the cutter so that gravitational pull will have little effect on the cut roving. This enables the operator to shoot overhead, or at any desirable angle, including an inverting of the gun. The resistance of the air met by the ejected roving prior to its entry into the resin stream causes each cut length of roving strand to separate into individual filaments which originally were combined to form the strand.

The operation of the apparatus is as follows:

Two pressure pots (not shown) are filled with the selected synthetic resin. For instance, a polyester resin of the type as disclosed in United States Patents 2,255,313; 2,443,735; 2,443,736; 2,443,737; 2,443,738; 2,443,739; 2,443,740; 2,443,741; or 2,510,503 may be selected. I have found to be suitable a low molecular weight polyester type synthetic resin composed of three parts polyester resin (esterification product of one or more polyhydric alcohols, such as ethylene, propylene, diethylene, or dipropylene glycol, with equimolecular quantities of a saturated dibasic acid, such as phthalic anhydride, and an unsaturated dibasic acid, such as maleic anhydride) dissolved in one part reactive vinyl type monomer, such as styrene.

Assuming use of a polyester type synthetic resin as above described, equal quantities of the resin will be placed in each of the pressure pots. Into each pressure pot will be placed one percent (1%) by weight silica or silica gel, which increases the thixotropic antisag characteristics of the resin. Into one of the pots will be placed one percent (1%) by weight diethyl aniline, and into the other pot one percent (1%) by weight benzyl peroxide catalyst. If extreme fast curing is desired three-four percent (3%-4%) by weight benzyl peroxide catalyst may be used.

One of the hoses 79 is attached to one of the pressure pots and the other hose to the other pressure pot. An air pressure supply is attached to the pressure pots to pressurize them, such as by attachment to a compressed air cylinder, and the hose 29 is attached to the same air pressure supply.

Roving is fed into the cutter means H, the cutter means H adjusted by cam 120 to the desired angle with respect to the spray streams, the mold or article to be treated is set up and the trigger 90 depressed, spraying the mixture from one of the pressure pots through one of the nozzles and the mixture from the other pressure pot through the other nozzle and depositing the cut roving in the spray stream. The nozzles are positioned so that sprays therefrom intersect and intermix with each other, the cut roving is fed into the intermixed spray, and the intermixed sprays and cut rovings are deposited upon the mold or article to be treated. A chemical reaction is caused by intermixture of the sprays so that the resin will cure to the desired degree of hardness upon the mold or article to be treated after a predetermined time.

It will be noted that stop means E regulates maximum depression of the trigger 90, such depression simultaneously regulating the operation of valve means C and G. The simultaneous actuation of valve means C and G provides cut roving dispensing at a rate proportional to the rate of flow of the resin. The proportion of cut roving to resin may be carried up to 42% cut roving to 58% resin by regulating the roving supply to cutter means H, by braking the air motor, and by other means well known in the art. However, this gun is so designed that best results are obtained when the following procedure is used to vary the glass-resin ratio:

(A) Air valve means C is so constructed that depression of shaft 32 as little as one sixteenth of an inch ($\frac{1}{16}$") will permit unrestricted flow of air from passageway 14 to passageway 22. Further depression will not permit the flow of any greater volume of air.

(B) Fluid valve means G is so constructed that the further back the shafts 85 are withdrawn from the restricted outlet portion 81 the greater the volume of fluid that is permitted to flow.

Therefore, the further trigger means D is compressed the greater the supply of fluid, while the supply of air to motor 38 remains the same. Inasmuch as the air motor, air nozzles and fluid tank pressures are all interconnected and powered by one common, advanced air supply, the force or power of the air motor, which determines the output of the roving, and the force or power that moves the fluid out of the tanks is always equalized. Thus, the only way to vary the ratio of roving to resin is by restricting the flow of either resin or roving. I accomplish this by letting the air supply have a normal, constant, unrestricted flow at all times, and by adjusting the restriction of the fluid supply by stop means E. It is to be noted that fluctuations of air pressure will have a balanced effect upon both resin and roving supply and that therefore variation in air pressure will not affect the ratio of resin to roving.

The length of cut roving supplied may be varied by removal of several of the cutting blades 143.

Of course, it may be desirable in some instances to apply the resin without fiber reinforcement, in which case the motor 138 may be merely turned off, by a conventional air valve cock (not shown), or the strands of roving removed from the cutter means H.

When the trigger 90 is depressed, toward the handle 10, both valve means C and valve means G are simultaneously activated, so that air through the hose 20 and fluid through the hoses 79 are simultaneously supplied. Upon depression of the trigger 90, air flows through chamber 14, past plunger 35, through opening 38, into chamber 39, through outlets 40, about the narrowed portion 42 of the housing 41 of chamber 20, through opening 23, and into passageway 22. A portion of the air flows from passageway 22, through hose 28, and drives motor 138, with the remainder of the air flowing from passageway 22, through passageway 54, into passageways 62 and 63, from passageway 62 to passageway 65 and from passageway 63 to passageway 66, through the respective passageways 74 of nozzles 55 and 56, through the respective passageways 82 of fluid nozzles 72 and out through the respective openings 84 of nozzles 55 and 56.

Simultaneously with the flow of air as above described, fluid will flow through hoses 79, into the respective passageway 77 of each nozzle 55 and 56, through the respective passageways 80 and out through the respective restricted outlet openings 81.

When the trigger 90 is released, plunger 35 is seated in opening 38, cutting off the air supply and simultaneously therewith the needle portion 86 of valve means G will be seated within the respective restricted outlet openings 81, cutting off the fluid supply.

Various changes in the shape, size and arrangement of parts may be made to the form of the invention shown and described without departing from the spirit of the invention or the scope of the following claims.

I claim:

1. In apparatus for spray depositing fiber reinforced synthetic resins, a spray gun for delivering an atomized spray along a predetermined path, cutter means for delivering cut roving to within the path of the atomized spray issuing from said spray gun, said cutter means having a mouth for discharge of cut roving therefrom, and attaching means for mounting said cutter means upon said spray gun, said attaching means including pivot means and means for pivotally varying the position of said mouth of said cutter means with respect to said spray gun and regulating the angle and distance from said spray gun at which cut roving may be delivered to within the path of the spray issuing from said spray gun.

2. Apparatus as specified in claim 1 wherein said last mentioned means includes a cam surface provided upon said cutter means and a cam mounted upon said spray gun and abutting said cam surface in juxtaposition for regulating the pivotal positioning of said cutter means upon said spray gun.

3. In apparatus for spray depositing fiber reinforced synthetic resins, a spray gun for delivering an atomized spray along a predetermined path, cutter means for delivering cut roving to within the atomized spray issuing from said spray gun, said cutter means having a mouth for discharge of cut roving therefrom and ejection means for the directed forceful ejection of cut roving therefrom, and attaching means for mounting said cutter means upon said spray gun with said mouth thereof disposed vertically above the path of spray issuing from said gun in juxtaposition so that cut roving discharged from said mouth is delivered into the spray issuing from said spray gun in substantially filament separated pattern, said attaching means including pivot means, a cam surface provided upon said cutter means and a cam mounted upon said spray gun and abutting said cam surface in juxtaposition for regulating the pivotal positioning of said cutter means upon said spray gun and varying the position of said mouth angularly with respect to the path of spray issuing from said spray gun for delivering cut roving to within the spray issuing from said spray gun at a predetermined distance from said spray gun.

4. In apparatus for spray depositing fiber reinforced synthetic resins, a spray gun for delivering an atomized spray, and cutter means mounted upon said spray gun for delivering cut roving to within the atomized spray issuing from said spray gun, said cutter means including a housing, roving feeding and cutting means mounted upon said housing, said roving feeding and cutting means including a cutter roller rotatably mounted upon said housing, said cutter roller including a main body portion having a plurality of slots peripherally thereabout and a groove at each side thereof, a blade mounted in each of the slots of said body portion, the ends of said blades terminating at the sides of said body portion and each end of each blade having a groove coextensive with the groove of said body portion, a resilient retaining ring mounted in the grooves of said body portion and blades, at end thereof, and removable fastener means secured to said body portion for retaining said rings in place, motor means for rotating said cutter roller, a first idler roller rotatably mounted in said housing and having a substantially resilient peripheral sleeve thereabout, said peripheral sleeve contacting said cutter roller and providing cutting means for severing elongated roving strands into a plurality of short lengths of cut roving, said contact of said sleeve with said cutter roller driving said first idler roller at the same surface speed of rotation as said cutter roller, and a second idler roller rotatably mounted on said housing, said second idler roller being spaced from said cutter roller and contacting said sleeve of said first idler roller, said contact of said second idler roller and said sleeve driving said second idler roller at the same surface speed of rotation as said first idler roller and said cutter roller and providing feeding means for moving strands of roving into said cutting means at a rate substantially equal to the surface rate of rotation of said cutter roller, said second idler roller being positioned with respect to said cutter roller for delivery of strands in a cutting relationship between said cutter roller and said first idler roller.

5. In apparatus for spray depositing fiber reinforced synthetic resins, a spray gun including a main body portion, at least a pair of spray means attached to said main body portions, said spray means being juxtaposed with respect to each other so that the axis of the spray pattern of each spray means is in a common plane, cutter means, said cutter means including means for discharging cut roving along a predetermined path, and attaching means for mounting said cutter means on said main body portion, said means for discharging cut roving from said cutter means being spaced to one side of the plane of the axes of the paths of spray issuing from said spray means in juxtaposition for directing the path of cut roving issuing from said cutter means in an angular position of intersection with the plane of the axes of the paths of spray issuing from said spray means, said attaching means including pivot means and means for moving said cutter means and said means for discharging cut roving with respect to said body portion about said pivot means in regulating the angle and distance at which cut roving may be delivered to intersect the plane of the axes of the paths of spray issuing from said spray means.

6. In apparatus for spray depositing aggregate reinforced plastics, a spray gun including a main body portion, nozzle means for spray depositing a plastic, means for attaching said nozzle means to said main body portion in juxtaposition so that spray issues from said nozzle means at a fixed axis with respect to said main body portion, cutter means, said cutter means including means for discharging cut aggregate along a predetermined path, and attaching means for mounting said cutter means on said main body portion of said spray gun, said means for discharging cut aggregate from said cutter means being spaced to one side of the axis of the spray issuing from said nozzle means in juxtaposition for directing the path of cut aggregate issuing from said cutter means in an angular position of intersection with the axis of spray issuing from said nozzle means, said attaching means including pivot means and means for moving said cutter means and said means for discharging cut aggregate with respect to said body portion about said pivot means in regulating the angle and distance at which cut aggregate may be delivered to intersect the axis of the spray issuing from said nozzle means.

References Cited in the file of this patent

UNITED STATES PATENTS

| | | |
|---|---|---|
| 2,719,336 | Stotler | Oct. 4, 1955 |
| 2,787,314 | Anderson | Apr. 2, 1957 |
| 2,813,751 | Barrett | Nov. 19, 1957 |
| 2,829,006 | Johansson | Apr. 1, 1958 |
| 2,850,421 | Thompson | Sept. 2, 1958 |
| 2,995,173 | Nawalanic | Aug. 8, 1961 |
| 3,025,195 | Kozma | Mar. 13, 1962 |
| 3,032,278 | Thomas et al. | May 1, 1962 |
| 3,033,472 | Shelton-V | May 8, 1962 |
| 3,034,213 | Milligan | May 15, 1962 |
| 3,042,567 | King | July 3, 1962 |

FOREIGN PATENTS

| | | |
|---|---|---|
| 340,050 | Switzerland | Sept. 15, 1959 |